US012327964B1

(12) United States Patent
Chen

(10) Patent No.: US 12,327,964 B1
(45) Date of Patent: Jun. 10, 2025

(54) 28-PIN DUAL-TONGUE MAGNETIC CONNECTOR AND DUAL-TONGUE CONNECTOR

(71) Applicant: Chuhong Chen, Shantou (CN)

(72) Inventor: Chuhong Chen, Shantou (CN)

( * ) Notice: Subject to any disclaimer, the term of this patent is extended or adjusted under 35 U.S.C. 154(b) by 0 days.

(21) Appl. No.: 18/977,807

(22) Filed: Dec. 11, 2024

(30) Foreign Application Priority Data

Dec. 11, 2023 (CN) ........................ 202323365919.4

(51) Int. Cl.

| | |
|---|---|
| ***H01R 24/60*** | (2011.01) |
| ***H01R 13/405*** | (2006.01) |
| ***H01R 13/504*** | (2006.01) |
| ***H01R 13/62*** | (2006.01) |
| ***H01R 13/627*** | (2006.01) |

(52) U.S. Cl.

CPC ........... *H01R 24/60* (2013.01); *H01R 13/405* (2013.01); *H01R 13/504* (2013.01); *H01R 13/6205* (2013.01); *H01R 13/6271* (2013.01)

(58) Field of Classification Search

CPC ...... H01R 13/40; H01R 13/502; H01R 13/62; H01R 13/6205; H01R 24/00

See application file for complete search history.

(56) References Cited

U.S. PATENT DOCUMENTS

| | | | | |
|---|---|---|---|---|
| 8,834,185 B2 * | 9/2014 | Wu | .................... | H01R 13/6658 439/76.1 |
| 8,926,339 B2 * | 1/2015 | Houtz | ................ | H01R 13/6658 439/76.1 |
| 10,333,249 B1 * | 6/2019 | Wang | ................. | H01R 13/6205 |
| 11,303,051 B2 * | 4/2022 | Rita | ................... | H01R 13/6461 |
| 11,728,602 B2 * | 8/2023 | Deng | ..................... | H01R 31/06 439/39 |

FOREIGN PATENT DOCUMENTS

| | | |
|---|---|---|
| CN | 108448347 A | 8/2018 |
| CN | 211719877 U | 10/2020 |
| CN | 214797956 U | 11/2021 |

* cited by examiner

*Primary Examiner* — Oscar C Jimenez
(74) *Attorney, Agent, or Firm* — George D. Morgan

(57) ABSTRACT

Disclosed are a 28-pin dual-tongue magnetic connector and a dual-tongue connector, the connector includes two tongues, and 28 terminals are arranged on inner sides of the two tongues; compared with the prior art, the 28 terminals can achieve a lower loop impedance on a power supply loop and allow applications with higher power. Further, arrangement of the 28 terminals on the inner sides of the two tongues can provide good dustproof effects, and better heat distribution can be achieved. The terminals on both sides are far apart, making them less likely to generate crosstalk when data runs at a high frequency of 80 Gbps and a high power of 480 W, thereby ensuring stable and efficient data transmission.

5 Claims, 6 Drawing Sheets

28-PIN DUAL-TONGUE MAGNETIC CONNECTOR AND DUAL-TONGUE CONNECTOR

CROSS-REFERENCE TO RELATED APPLICATIONS

The application claims priority to Chinese patent application No. 2023233659194, filed on Dec. 11, 2023, the entire contents of which are incorporated herein by reference.

TECHNICAL FIELD

The present disclosure relates to the field of connectors, and particularly relates to a 28-pin dual-tongue magnetic connector and a dual-tongue connector.

BACKGROUND

At present, when handling power above 480 W, existing connectors with fewer than 24 pins are gradually replaced by 24-pin connectors due to a great power supply loop impedance and excessive temperature rise. However, the prior art mainly adopts a single tongue with contact points arranged on both sides, such as a new-type 24-pin docking magnetic connector disclosed in the prior application CN216958577U., when under high-power load conditions, prolonged exposure to high temperatures will accelerate the aging of the tongue, and the existing connectors are prone to breakage or damage when the product is engaged during normal attraction. In addition, the single tongue poses a risk of common-mode crosstalk at an ultra-high frequency of 80 Gbps, which may result in data transmission failure.

SUMMARY

In view of the above, a first objective of the present disclosure is to provide a 28-pin dual-tongue magnetic connector.

The 28-pin dual-tongue magnetic connector adopts the following solution:

the magnetic connector includes two tongues, and 28 terminals are arranged on inner sides of the two tongues; compared with the prior art, the 28 terminals can achieve a lower loop impedance on a power supply loop and allow applications with higher power. Most importantly, arrangement of the 28 terminals on the inner sides of the two tongues can provide good dust-proof effects, and better heat distribution can be achieved. Further, The terminals on both sides are far apart, making them less likely to generate crosstalk when data runs at a high frequency of 80 Gbps and a high power of 480 W, thereby ensuring stable and efficient data transmission.

Specifically, the 28-pin dual-tongue magnetic connector is composed of a male connector and a female connector;

the female connector includes a main body plastic shell, a first magnetic sleeve and the two tongues, the two tongues are an upper tongue terminal mold shell and a lower tongue terminal mold shell, the upper tongue terminal mold shell and the lower tongue terminal mold shell are interspersed in the main body plastic shell, the first magnetic sleeve is sleeved over a front end of the main body plastic shell, 14 terminals are respectively sheathed in the upper tongue terminal mold shell and the lower tongue terminal mold shell, and the terminals protrude from inner sides of the upper tongue terminal mold shell and the lower tongue terminal mold shell to form contact points;

the male connector includes an upper terminal mold shell, a lower terminal mold shell, a snap-fit latch, a plastic main body, a secondary sheathing mold shell, an iron shell, a second magnetic sleeve, a rear magnet cover, and a front magnet cover, the upper terminal mold shell and the lower terminal mold shell are attached to each other, with the snap-fit latch being sandwiched between them, 14 terminals are respectively sheathed in the upper terminal mold shell and the lower terminal mold shell, and the snap-fit latch is configured to form a snap-fit position after docking with an application device terminal; and the plastic main body is sheathed over rear ends of the upper terminal mold shell and the lower terminal mold shell, the secondary sheathing mold shell is sheathed over front ends of the upper terminal mold shell and the lower terminal mold shell, the secondary sheathing mold shell is provided with two slots that fit with the upper tongue terminal mold shell and the lower tongue terminal mold shell, the 14 terminals sheathed in the upper terminal mold shell and the lower terminal mold shell are respectively bent outward towards inner walls of the two slots to form 28 elastic contact points, the iron shell is sleeved over the plastic main body, the secondary sheathing mold shell is sheathed over front ends of the upper terminal mold shell and the lower terminal mold shell, the second magnetic sleeve is sleeved over the secondary sheathing mold shell, the front magnet cover is sleeved over the second magnetic sleeve, the rear magnet cover is sleeved over the iron shell from a rear end of the iron shell and is sheathed over the front magnet cover, and an expansion sleeve is arranged between the front magnet cover and the iron shell.

A dual-tongue connector, including a connector body, which is formed by connecting a female connector and a male connector, and a transmission structure for signal transmission is arranged between the female connector and the male connector; and the transmission structure includes at least two tongues and two slots, each of the slots accommodates at most one tongue, and the tongues are in contact with elastic contact points in the slots to realize transmission of electrical signals.

The dual-tongue connector provided in the present disclosure aims to solve the following technical problems of:

1. accelerated aging at high temperatures;
2. high interference frequency in high-frequency transmission; and
3. easy breakage and damage.

Further, the slots are both arranged on the female connector, and the tongues are both arranged on the male connector.

Further, the slots are both arranged on the male connector, and the tongues are both arranged on the female connector.

Further, the tongues are provided with contact points, and the contact points are in contact with the elastic contact points to realize transmission of electrical signals, where the contact points are located on inner surfaces of the tongues that are facing each other.

The present disclosure has the beneficial effects:

1. The transmission structure of the dual-tongue connector in the present disclosure is composed of at least two tongues and slots. When current flows through, heat dissipated from the tongues is distributed in the corresponding slot. For the traditional single-tongue connection, the transmission structure splits a tongue into a plurality of tongues, which is conducive to avoiding heat source concentration and controlling the heat, and accordingly reducing the aging of the tongues.

2. Similarly, the bifurcated transmission structure reduces the numbers of the elastic contact points and the contact points in the tongues and the slots. For an electrical component, the simpler an electrical circuit is, the lower a risk of common-mode crosstalk faces, therefore, the stability of the present disclosure is significantly improved.
3. Design of the plurality of tongues and the slots provides more contact points, and can distribute external force, such as shear force and torque, uniformly to each of the tongues, such that the transmission structure has a more stable connection and better resistance to deformation.

Figure 1:
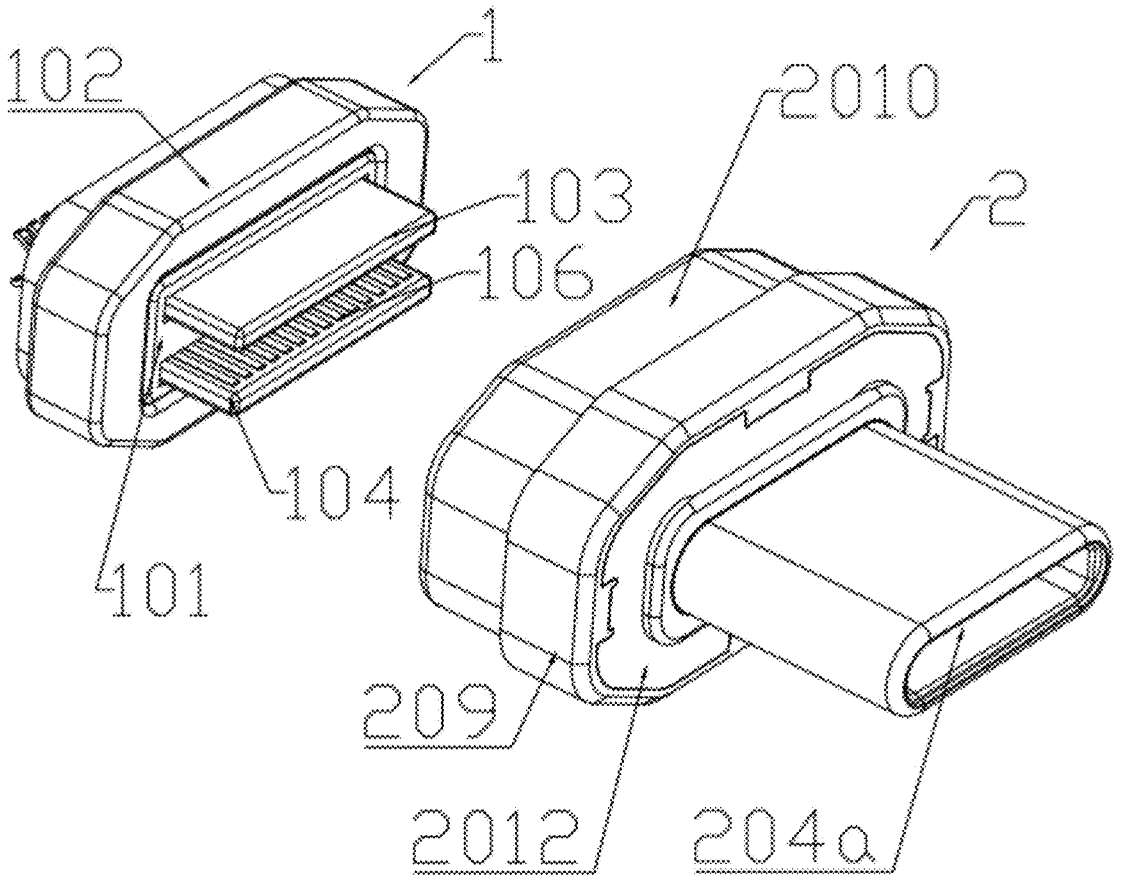
FIGS. 1-2 are three-dimensional structural diagrams of a 28-pin dual-tongue magnetic connector according to the present disclosure from different angles of view.

Reference numerals in the accompanying drawings: 1. female connector; 101. main body plastic shell; 102. first magnetic sleeve; 103. upper tongue terminal mold shell; 104. lower tongue terminal mold shell; 105. positioning step; 106. contact point; 2. male connector; 201. upper terminal mold shell; 202. lower terminal mold shell; 202*a*. positioning column; 203. snap-fit latch; 203*a*. positioning hole; 203*b*. elastic latch portion; 204. plastic main body; 204*a*. cavity; 205. secondary sheathing mold shell; 205*a*. slot; 206. iron shell; 208. second magnetic sleeve; 209. rear magnet cover; 2010. front magnet cover; 2011. elastic contact point; and 2012. expansion sleeve.

DETAILED DESCRIPTION OF THE EMBODIMENTS

The technical solutions of embodiments of the present disclosure will be described below clearly and comprehensively in conjunction with accompanying drawings of the embodiments of the present disclosure. Apparently, the embodiments described are merely some embodiments rather than all embodiments of the present disclosure. On the basis of the embodiments in the present disclosure, all other embodiments acquired by those of ordinary skill in the art without making creative efforts fall within the scope of protection of the present disclosure.

Figure 2:
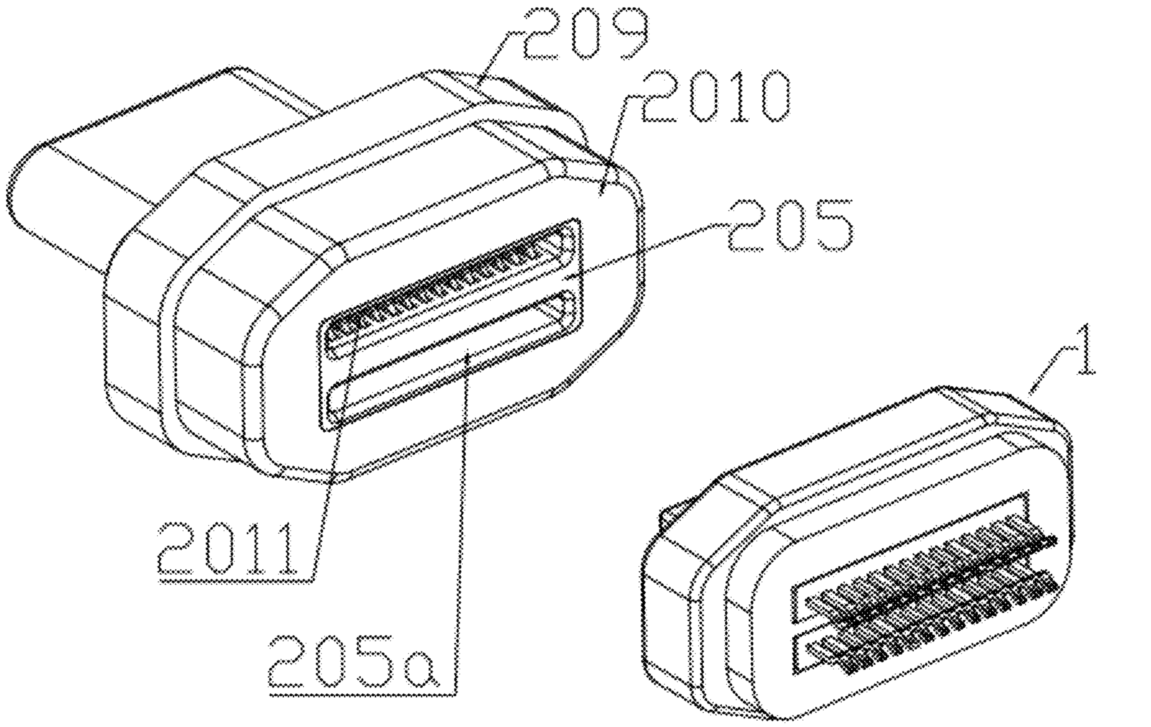
Figure 3:
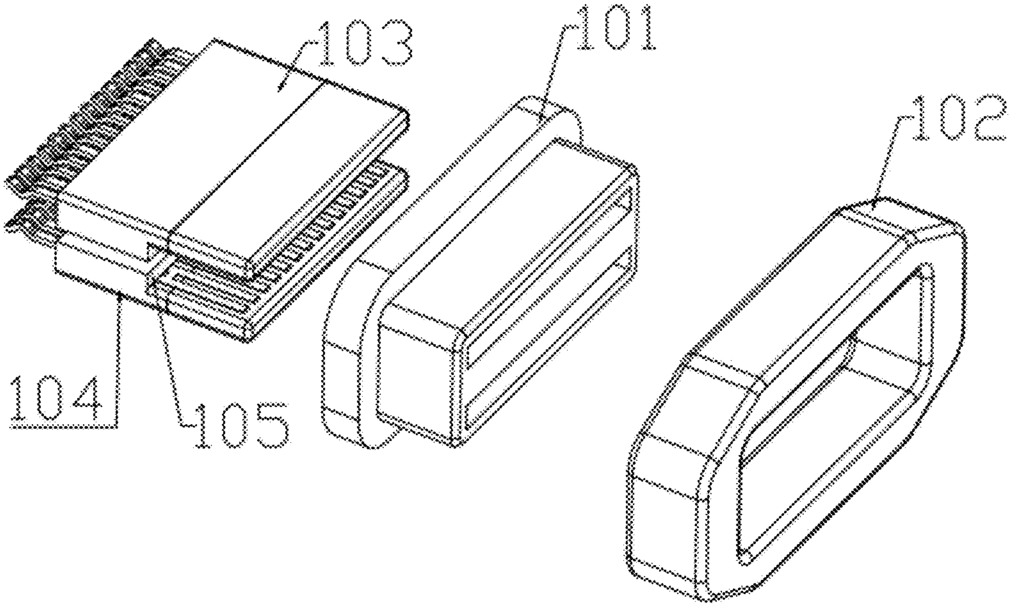
FIG. 3 is an exploded view of a female connector according to the present disclosure.
Figure 4:
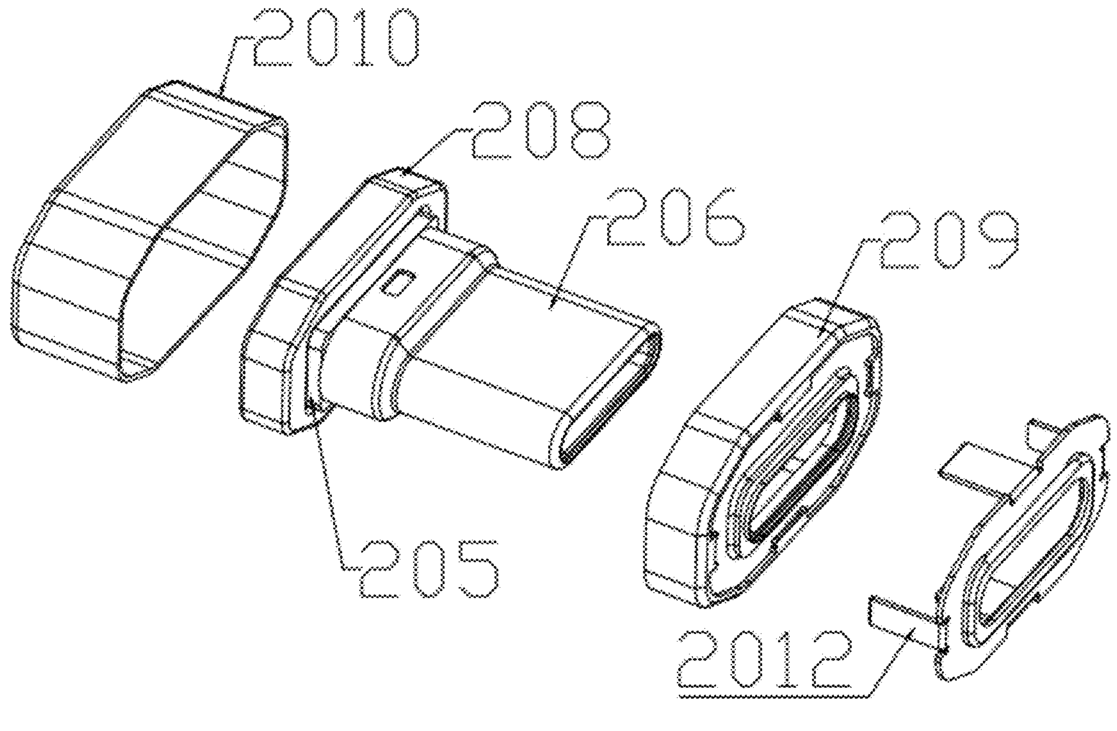
FIGS. 4-6 are step-by-step exploded views of a male connector according to the present disclosure.
Figure 5:
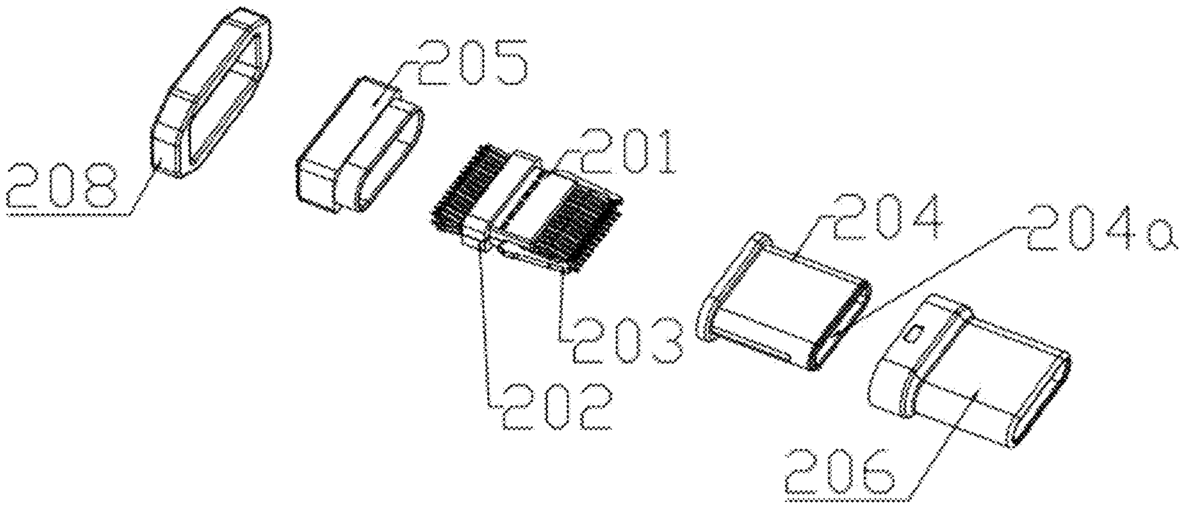
Figure 6:
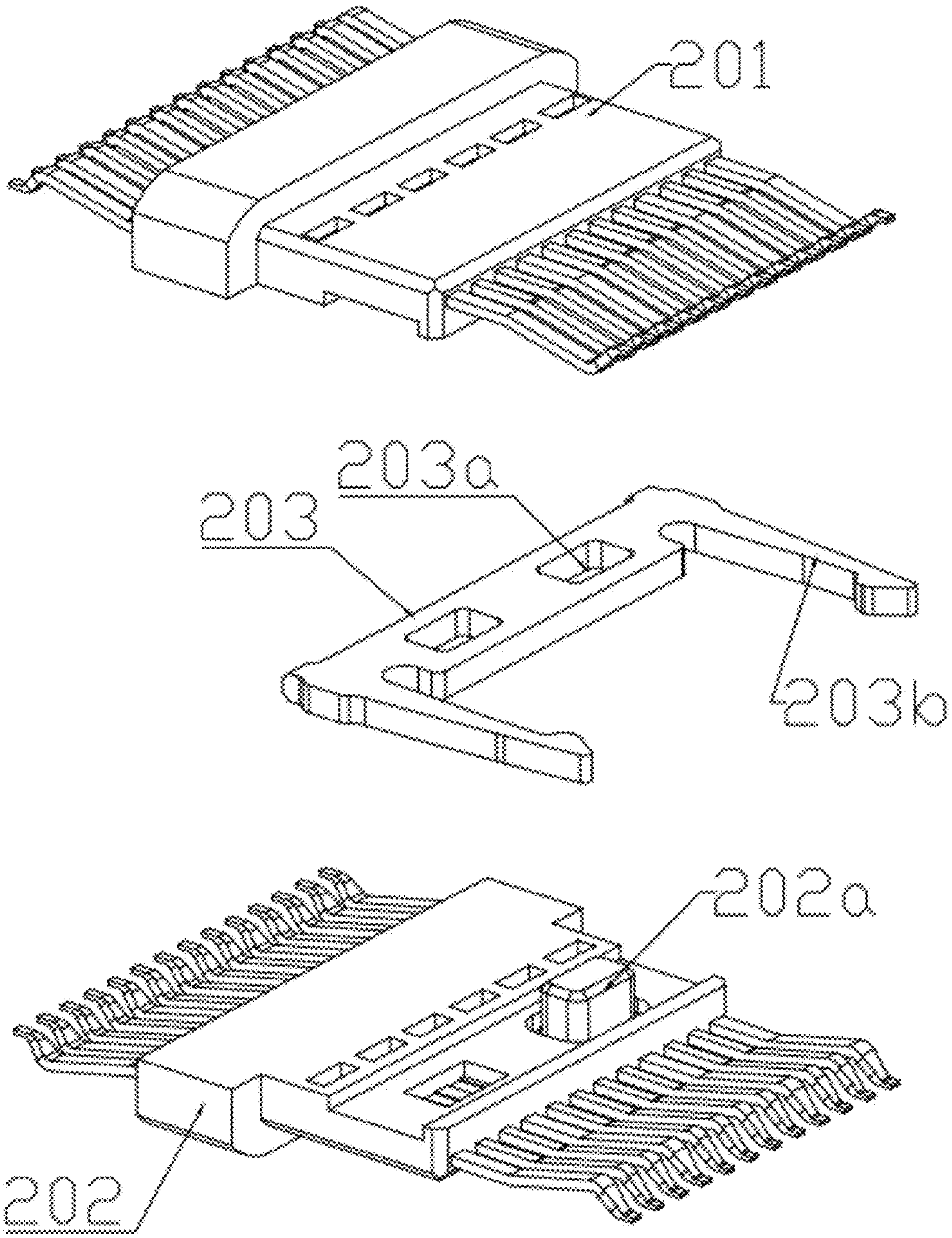

With reference to FIGS. 1-6, a 28-pin dual-tongue magnetic connector is provided, the connector includes a male connector 2 and a female connector 1;

where the female connector 1 includes a main body plastic shell 101, a first magnetic sleeve 102, an upper tongue terminal mold shell 103, and a lower tongue terminal mold shell 104;

the upper tongue terminal mold shell 103 and the lower tongue terminal mold shell 104 are interspersed in the main body plastic shell 101, the upper tongue terminal mold shell 103 and the lower tongue terminal mold shell 104 have different front and rear volumes to form a positioning step 105, and the positioning step 105 is configured to determine positions of the upper tongue terminal mold shell 103 and the lower tongue terminal mold shell 104 in the main body plastic shell 101, such that the upper tongue terminal mold shell 103 and the lower tongue terminal mold shell 104 protrude from the main body plastic shell 101 by the same length;

the first magnetic sleeve 102 is sleeved over a front end of the main body plastic shell 101, and the first magnetic sleeve and the main body plastic shell can be fixed by interference fit or adhesive bonding; and 14 terminals are respectively sheathed in the upper tongue terminal mold shell 103 and the lower tongue terminal mold shell 104, and the terminals protrude from inner sides of the upper tongue terminal mold shell 103 and the lower tongue terminal mold shell 104 to form contact points 106.

The male connector 2 includes an upper terminal mold shell 201, a lower terminal mold shell 202, a snap-fit latch 203, a plastic main body 204, a secondary sheathing mold shell 205, an iron shell 206, a second magnetic sleeve 208, a rear magnet cover 209, and a front magnet cover 2010;

the upper terminal mold shell 201 and the lower terminal mold shell 202 are attached to each other, with the snap-fit latch 203 being sandwiched between them, positioning columns 202*a* are arranged on inner sides of the upper terminal mold shell 201 and the lower terminal mold shell 202, positioning holes 203*a* that fit with the positioning columns 202*a* are formed on the snap-fit latch 203, and positions of the snap-fit latch 203 can be fixed through the positioning columns 202*a*;

14 terminals are respectively sheathed in the upper terminal mold shell 201 and the lower terminal mold shell 202;

the plastic main body 204 is sheathed over rear ends of the upper terminal mold shell 201 and the lower terminal mold shell 202, and a cavity 204*a* for docking with an application device terminal is formed at the rear ends thereof; and further, elastic latch portions 203*b* of the snap-fit latch 203 are also located inside the cavity 204*a*, and a snap-fit position is formed after docking with the application device terminal;

the secondary sheathing mold shell 205 is sheathed over front ends of the upper terminal mold shell 201 and the lower terminal mold shell 202, the secondary sheathing mold shell 205 is provided with two slots 205*a* that fit with the upper tongue terminal mold shell 103 and the lower tongue terminal mold shell 104 of the female connector 1, the 14 terminals sheathed in the upper terminal mold shell 201 and the lower terminal mold shell 202 are respectively bent outward towards inner walls of the two slots 205*a* to form 28 elastic contact points 2011, and the elastic contact points 2011 are more conducive to making connect with the contact points 106 of the male connector 2, such that the elastic contact points and the contact points are tightly pressed together, and a bonding strength between the male connector 2 and the female connector 1 is effectively improved; and the iron shell 206 is sleeved over the plastic main body 204, the second magnetic sleeve 208 is sleeved over the secondary sheathing mold shell 205, the front magnet cover 2010 is sleeved over the second magnetic sleeve 208, the rear magnet cover 209 is sleeved over the iron shell 206 from a rear end of the iron shell 206 and is sheathed over the front magnet cover 2010, an expansion sleeve 2012 is arranged between the iron shell 206 and the rear magnet cover 209, the expansion sleeve 2012 has four spring tabs that are inserted from the rear magnet cover 209 into the front magnet cover 2010, the front magnet cover 2010 can be tightened and fixed through the four spring tabs, and the rear magnet cover 209 is accordingly held in place, such that the terminals inside the connector are protected from being affected by an external environment, and strength and structure of the structure are improved.

Specific embodiment of the present disclosure will be described in detail below:

a dual-tongue connector is provided, the connector includes a connector body, which is formed by connecting a female connector 1 and a male connector 2, and a transmission structure for signal transmission is arranged between the female connector 1 and the male connector 2; and the transmission structure includes at least two tongues and two slots 205*a*, each of the slots 205*a* accommodates at most one tongue, and the tongues are in contact with elastic contact points 2011 in the slots 205*a* to realize transmission of electrical signals.

Numbers of the tongues and the slots are optional, and can be set to three, four, or other numbers according to actual conditions.

The transmission structure in the present disclosure is composed of at least two tongues and slots 205*a*. When current flows through, heat dissipated from the tongues is distributed in the corresponding slot 205*a*. For the traditional single-tongue connection, the transmission structure splits a tongue into a plurality of tongues, which is conducive to avoiding heat source concentration and controlling the heat, and accordingly reducing the aging of the tongues;

similarly, the bifurcated transmission structure reduces the numbers of the elastic contact points 2011 and the contact points 106 in the tongues and the slots 205*a*. For an electrical component, the simpler an electrical circuit is, the lower a risk of common-mode crosstalk faces, therefore, the stability of the present disclosure is significantly improved; and design of the plurality of tongues and the slots 205*a* provides more contact points, and can distribute external force, such as shear force and torque, uniformly to each of the tongues, such that the transmission structure has a more stable connection and better resistance to deformation.

Further, the slots 205*a* are both arranged on the female connector 1, and the tongues are both arranged on the male connector 2; alternatively, the slots 205*a* are both arranged on the male connector 2, and the tongues are both arranged on the female connector 1; the tongues and the slots 205*a* can be arranged in two ways. In order to make the specification more fully explained, the way that the tongues are both arranged on the female connector 1 and the slots 205*a* are both arranged on the male connector 2 is taken as an embodiment for specific description below:

the tongues are provided with contact points 106, and the contact points 106 are in contact with the elastic contact points 2011 to realize transmission of electrical signals, where the contact points 106 are located on inner surfaces of the tongues that are facing each other.

Further, the tongues are both arranged on the female connector 1, where the female connector 1 includes a main body plastic shell 101, and a first magnetic sleeve 102, the tongues are an upper tongue terminal mold shell 103 and a lower tongue terminal mold shell 104, and the upper tongue terminal mold shell 103 and the lower tongue terminal mold shell 104 are interspersed in the main body plastic shell 101; the first magnetic sleeve 102 is sleeved over a front end of the main body plastic shell 101; specifically, the first magnetic sleeve 102 and the main body plastic shell 101 can be fixed by interference fit or adhesive bonding; and an objective of using the first magnetic sleeve 102 in the above solution is to enable the female connector 1 to have magnetic attraction capabilities.

Further, the main body plastic shell 101 is provided with a positioning groove for the upper tongue terminal mold shell 103 and the lower tongue terminal mold shell 104 to pass through, a positioning step 105 extending outward are formed on faces of the upper tongue terminal mold shell 103 and the lower tongue terminal mold shell 104 opposite to each other, and after the upper tongue terminal mold shell 103 and the lower tongue terminal mold shell 104 pass through the positioning groove, the positioning step 105 abuts against a side of the positioning groove, such that the upper tongue terminal mold shell 103 and the lower tongue terminal mold shell 104 protrude from the main body plastic shell 101 by the same length, which aims to constrain a length of movements of the upper tongue terminal mold shell 103 and the lower tongue terminal mold shell 104 in the positioning groove.

Further, the male connector 2 includes an upper terminal mold shell 201, a lower terminal mold shell 202, a snap-fit latch 203, a plastic main body 204, a secondary sheathing mold shell 205, an iron shell 206, a second magnetic sleeve 208, a rear magnet cover 209, and a front magnet cover 2010;

the upper terminal mold shell 201 and the lower terminal mold shell 202 are attached to each other, with the snap-fit latch 203 being sandwiched between them;

the plastic main body 204 is sheathed over rear ends of the upper terminal mold shell 201 and the lower terminal mold shell 202; the slots 205*a* are formed on the secondary sheathing mold shell 205, the secondary sheathing mold shell 205 is sheathed over front ends of the upper terminal mold shell 201 and the lower terminal mold shell 202 through the slots 205*a*, a plurality of terminals are arranged inside the upper terminal mold shell 201 and the lower terminal mold shell 202, and the terminals are either raised in an arched or recessed manner to form the elastic contact points 2011; and the elastic contact points 2011 are more conducive to making connect with the contact points 106 of the male connector 2, such that the elastic contact points and the contact points are tightly pressed together, and a bonding strength between the male connector 2 and the female connector 1 is effectively improved.

The iron shell 206 is sleeved over the plastic main body 204;

the second magnetic sleeve 208 is sleeved over the secondary sheathing mold shell 205;

the front magnet cover 2010 is sleeved over the second magnetic sleeve 208; and the rear magnet cover 209 is sleeved over the iron shell 206 from a rear end of the iron shell 206 and is sheathed over the front magnet cover 2010, an expansion sleeve 2012 is arranged between the rear magnet cover 209 and the iron shell 206, the expansion sleeve 2012 has four spring tabs that are inserted from the rear magnet cover 209 into the front magnet cover 2010, the front magnet cover 2010 can be tightened and fixed through the four spring tabs, and the rear magnet cover 209 is accordingly held in place, such that the terminals inside the connector are protected from being affected by an external environment, and strength and structure of the structure are improved.

Further, positioning columns 202*a* are arranged on inner sides of the upper terminal mold shell 201 and/or the lower terminal mold shell 202, and positioning holes 203*a* that fit with the positioning columns 202*a* are formed on the snap-fit latch 203.

Further, the plastic main body 204 forms a cavity 204*a* for docking with an application device terminal on a rear end, elastic latch portions 203*b* are arranged on the snap-fit latch 203, the elastic latch portions 203*b* are also located inside the cavity 204*a*, and a snap-fit position is formed after docking with the application device terminal;

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A 28-pin dual-tongue magnetic connector, comprising two tongues, and wherein 28 terminals are arranged on inner sides of the two tongues;

the 28-pin dual-tongue magnetic connector comprises a female connector, the female connector comprises a main body plastic shell and a first magnetic sleeve, the two tongues are an upper tongue terminal mold shell and a lower tongue terminal mold shell, and the upper tongue terminal mold shell and the lower tongue terminal mold shell are interspersed in the main body plastic shell; the first magnetic sleeve is sleeved over a front end of the main body plastic shell; and 14 terminals are respectively sheathed in the upper tongue terminal mold shell and the lower tongue terminal mold shell, and the terminals protrude from inner sides of the upper tongue terminal mold shell and the lower tongue terminal mold shell to form contact points.

2. The 28-pin dual-tongue magnetic connector according to claim 1, wherein the upper tongue terminal mold shell and the lower tongue terminal mold shell have different front and rear volumes to form a positioning step, and the positioning step is configured to determine positions of the upper tongue terminal mold shell and the lower tongue terminal mold shell in the main body plastic shell.

3. The 28-pin dual-tongue magnetic connector according to claim 1, comprising a male connector, wherein the male connector comprises an upper terminal mold shell, a lower terminal mold shell, a snap-fit latch, a plastic main body, a secondary sheathing mold shell, an iron shell, a second magnetic sleeve, a rear magnet cover, and a front magnet cover;

the upper terminal mold shell and the lower terminal mold shell are attached to each other, with the snap-fit latch being sandwiched between them;

14 terminals are respectively sheathed in the upper terminal mold shell and the lower terminal mold shell;

the plastic main body is sheathed over rear ends of the upper terminal mold shell and the lower terminal mold shell;

the secondary sheathing mold shell is sheathed over front ends of the upper terminal mold shell and the lower terminal mold shell, the secondary sheathing mold shell is provided with two slots that fit with the upper tongue terminal mold shell and the lower tongue terminal mold shell, the 14 terminals sheathed in the upper terminal mold shell and the lower terminal mold shell are respectively bent outward towards inner walls of the two slots to form 28 elastic contact points;

the iron shell is sleeved over the plastic main body;

the second magnetic sleeve is sleeved over the secondary sheathing mold shell;

the front magnet cover is sleeved over the second magnetic sleeve; and the rear magnet cover is sleeved over the iron shell from a rear end of the iron shell and is sheathed over the front magnet cover, and an expansion sleeve is arranged between the front magnet cover and the iron shell.

4. The 28-pin dual-tongue magnetic connector according to claim 3, wherein positioning columns are arranged on inner sides of the upper terminal mold shell and/or the lower terminal mold shell, and positioning holes that fit with the positioning columns are formed on the snap-fit latch.

5. The 28-pin dual-tongue magnetic connector according to claim 4, wherein the plastic main body forms a cavity on a rear end, elastic latch portions are arranged on the snap-fit latch, and the elastic latch portions are also located inside the cavity.

* * * * *